(12) United States Patent
Espiau et al.

(10) Patent No.: US 11,824,261 B2
(45) Date of Patent: Nov. 21, 2023

(54) 3D PRINTED RADIO FREQUENCY ABSORBER

(71) Applicants: Frederick Matthew Espiau, Topanga, CA (US); Gregory Peter Le Sage, Bethesda, MD (US)

(72) Inventors: Frederick Matthew Espiau, Topanga, CA (US); Gregory Peter Le Sage, Bethesda, MD (US)

( * ) Notice: Subject to any disclaimer, the term of this patent is extended or adjusted under 35 U.S.C. 154(b) by 0 days.

(21) Appl. No.: 16/821,872

(22) Filed: Mar. 17, 2020

(65) Prior Publication Data

US 2020/0220275 A1 Jul. 9, 2020

Related U.S. Application Data

(63) Continuation of application No. 15/064,451, filed on Mar. 8, 2016, now abandoned.
(Continued)

(51) Int. Cl.
*B29C 67/00* (2017.01)
*H01Q 17/00* (2006.01)
(Continued)

(52) U.S. Cl.
CPC .......... *H01Q 17/00* (2013.01); *B29C 64/106* (2017.08); *B29C 64/118* (2017.08); *B33Y 70/00* (2014.12); *B29K 2105/25* (2013.01); *B29K 2995/0006* (2013.01); *B29K 2995/0011* (2013.01); *B33Y 10/00* (2014.12); *B33Y 30/00* (2014.12)

(58) Field of Classification Search
CPC .......... B29C 64/106; B29K 2995/006; B29K 2995/0011; B33Y 10/00; H01Q 17/00
See application file for complete search history.

(56) References Cited

U.S. PATENT DOCUMENTS

2007/0087564 A1* 4/2007 Speakman ........ H01M 10/0436
438/674
2012/0092091 A1* 4/2012 Kang ...................... H01P 3/123
333/239
(Continued)

FOREIGN PATENT DOCUMENTS

| WO | WO 2014209994 A2 | 12/2014 |
| WO | WO 2015120429 A1 | 8/2015 |
| WO | WO 2015130401 A2 | 9/2015 |

OTHER PUBLICATIONS

Office Action 1 for U.S. Appl. No. 15/064,451, dated Jun. 21, 2018.
(Continued)

*Primary Examiner* — Ryan M Ochylski
(74) *Attorney, Agent, or Firm* — Tope-McKay & Associates (57) ABSTRACT

Described is a method for manufacturing a radio frequency (RF) absorber. The method includes first determining a set of desired RF absorption properties for a RF absorber. A computer model for the RF absorber having the determined set of desired RF absorption properties is then produced. Using a three-dimensional (3D) printing process, melted plastic filament loaded with a RF absorber material is deposited in in computer controlled patterns according to the computer model, thereby producing the RF absorber having the set of desired RF absorption properties.

8 Claims, 9 Drawing Sheets

100 — Producing a 3D structure with multiple regions using with a 3D printer having at least one extruder formed to receive a printer filament 102 — Using a printer filament having at least one type of material having RF absorption properties 104 — Varying RF absorption properties at different regions of the 3D structure by varying the extrusion of the material at different regions of the 3D structure

Related U.S. Application Data (60) Provisional application No. 62/177,242, filed on Mar. 9, 2015.

(51) Int. Cl.
  *B33Y 70/00* (2020.01)
  *B29C 64/118* (2017.01)
  *B29C 64/106* (2017.01)
  *B33Y 10/00* (2015.01)
  *B33Y 30/00* (2015.01)
  *B29K 105/00* (2006.01)

(56) References Cited

U.S. PATENT DOCUMENTS

| | | | |
|---|---|---|---|
| 2014/0328963 A1 | 11/2014 | Mark | |
| 2015/0201499 A1* | 7/2015 | Shinar | B29C 64/135 425/132 |
| 2015/0343705 A1 | 12/2015 | Chen | |
| 2015/0360427 A1* | 12/2015 | Shah | B29C 71/02 264/489 |
| 2016/0198576 A1 | 7/2016 | Lewis | |
| 2016/0325491 A1* | 11/2016 | Sweeney | B29C 64/264 |
| 2016/0346997 A1 | 12/2016 | Lewis | |
| 2017/0120528 A1 | 5/2017 | Tejada Palacios | |

OTHER PUBLICATIONS

Response to Office Action 1 for U.S. Appl. No. 15/064,451, dated Aug. 10, 2018.
Office Action 2 for U.S. Appl. No. 15/064,451, dated Sep. 17, 2018.
Gibson, I., Rosen, D., Stucker, B., "Additive Manufacturing Technologies," Second Edition, Springer, New York, (2015), pp. 147-173.
Response to Office Action 2 for U.S. Appl. No. 15/064,451, dated Dec. 17, 2018.
Office Action 3 for U.S. Appl. No. 15/064,451, dated Apr. 19, 2019.
Response to Office Action 3 for U.S. Appl. No. 15/064,451, dated Jul. 17, 2019.
Office Action 4 for U.S. Appl. No. 15/064,451, dated Aug. 20, 2019.
Response to Office Action 4 for U.S. Appl. No. 15/064,451, dated Nov. 20, 2019.

* cited by examiner

FIG. 1

FIG. 2A — Print mostly dielectric plastic
FIG. 2B — Print dielectric plastic with increased absorber content
FIG. 2C — Print high concentration of absorber Multiple printer filaments enable selectable mixtures of dielectric and absorber

3D PRINTED RADIO FREQUENCY ABSORBER

CROSS-REFERENCE TO RELATED APPLICATIONS

This is a Continuation application of U.S. application Ser. No. 15/064,451 filed on Mar. 8, 2016, entitled, "3D Printed Radio Frequency Absorber", which is a Non-Provisional Application of U.S. Provisional Patent Application No. 62/177,242 filed Mar. 9, 2015, entitled, "3D Printed Radio Frequency Absorber," the entirety of which are incorporated herein by reference.

BACKGROUND OF INVENTION

(1) Field of Invention

The present invention relates to a radio frequency absorber and, more particularly, to a radio frequency absorber that is three-dimensionally (3D) printed.

(2) Description of Related Art

Radio frequency absorber material is created commercially in forms including foams and flexible plastics that can be cut, or otherwise formed, into desired shapes. Other forms include formable and spreadable epoxy, or other curable materials, that can be applied to a desired region to harden in place. Such formable materials can also be injected into molds to create custom shapes or injected into interior regions to create an absorbing region. The goal in each of these cases is to apply absorber material in places where reflection of radio frequency energy is undesirable.

In other art, three-dimensional (3D) printing refers to various processes used to synthesize a three-dimensional object. In 3D printing, successive layers of material are formed under computer control to create an object. These objects can be created with almost any shape or geometry, and are produced from a 3D computer model or other electronic data source.

Currently, absorber loaded foam, rubber, or epoxy is molded, cut or machined, or otherwise formed, in the shape needed for an application. The material is uniform in base material and absorber concentration. Thus, a continuing need exists for a method of designing and producing complex structures made of radio frequency absorber materials which is more efficient than current methods and allows for greater customization.

SUMMARY OF THE INVENTION

The present invention relates to a radio frequency (RF) absorber and, more particularly, to a RF absorber that is three-dimensionally (3D) printed. A set of desired RF absorption properties for a RF absorber is determined, and a computer model for the RF absorber having the determined set of desired RF absorption properties is produced. Using a three-dimensional (3D) printing process, melted plastic filament loaded with a RF absorber material is deposited in computer controlled patterns according to the computer model, thereby producing the RF absorber having the set of desired RF absorption properties.

In another aspect, the method further includes depositing melted unloaded plastic filament in computer controlled patterns, such that the RF absorber comprises at least one region of RF absorber material and at least one region of plastic.

In another aspect, the method further includes printing, using the 3D printing process, the RF absorber to have more regions of plastic than RF absorber material.

In another aspect, the method further includes printing, using the 3D printing process, the RF absorber to have more regions of RF absorber material than plastic.

In another aspect, the method further includes printing, using the 3D printing process, air gaps in the RF absorber with a relative permittivity of $\varepsilon_r=1.0$.

In another aspect, the method further includes determining a desired thickness and dielectric constant for an anti-reflection coating for the RF absorber; and printing, using the 3D printing process, the anti-reflection coating having the desired thickness and dielectric constant for reflected wave cancellation.

In another aspect, the 3D printing process comprises depositing and mixing melted unloaded plastic filaments having different dielectric constants using a plurality of 3D printing extruders.

In another aspect, the present invention further includes a RF absorber produced by the method according to embodiments of this disclosure.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a radio frequency (RF) absorber and, more particularly, to a RF absorber that is three-dimensionally (3D) printed. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Specific Details of the Invention

Radio frequency (RF) absorber material is used frequently to reduce or nearly eliminate reflected power from internal and external surfaces. For instance, reduction of radar cross-section on a vehicle can be accomplished by coating external surfaces with radio frequency absorber material. An antenna measurement chamber uses radio frequency absorber material in foam block and cone shapes on interior walls as well as covering all metallic and other RF reflective parts so that reflected signals are minimized. The chamber can simulate free space since minimal signal is reflected from any interior surface. When used internally in structures intended to guide radio frequencies, RF absorbing material is used as a termination. Incident power is not reflected, but absorbed and dissipated. RF absorber material can also be part of a RF shielding enclosure.

RF absorber material can be created by mixing an absorbing material, such as carbon, with at least one structural material, non-limiting examples of which include foams, plastics, and resins. A range of absorption per unit length can be designed by adding more or less absorbing material, such as carbon. The dielectric properties of the absorber material are determined by the matrix material (e.g., foam) as well as the density of the structure. Currently, absorber loaded foam, rubber, or epoxy is molded, cut or machined, or otherwise formed, in the shape needed for an application. The material is uniform in base material and absorber concentration. Switching this directly to 3D printing, as described in the present disclosure, makes it easy to make absorber parts compared to manual shaping, molding, or machining.

Using 3D printing, tapered properties are also possible by increasing or decreasing the percentage of absorber material or changing density as a function of length. Both the RF absorber concentration and dielectric properties, as well as their tapered profile, can be used to optimize RF absorption at a given frequency (e.g., to minimize reflection of radio frequency power). Power density must also be considered to assure that heating of absorber material stays within tolerable design specification. Reducing RF absorption per unit length and increasing volume allows higher power levels to be accommodated. A non-limiting example is a column of absorber. At the bottom, absorbing material (e.g., carbon) is in maximum concentration. At the top, carbon is minimized and plastic is maximized. As a function of height in the object, the ratio of carbon and plastic can change continuously, in discrete steps, or any custom 3D profile that is desired.

A custom profile of dielectric properties and absorption properties in any direction is possible with a 3D printed structure built layer-by-layer with mixtures of plastics with or without absorption loading. Air spaces can also be included in 3D printed structures. Air spaces are a limiting case of relative dielectric constant equal to nearly 1.0. The profile will influence microwave transmission, absorption, and reflection. There are layered structures in the prior art, but they are stacked using conventional techniques, such as sheets of material stacked and glued together. The system according to embodiments of the present disclosure directly prints a 3D structure with any varying profile of absorber and base material at any location in x, y, z space. A 3D printed structure is composed of individual 2D layers. The profile of each layer is determined, for example, by which print head deposits plastic at given x, y locations. Any location can have a variety of unloaded plastics, determining the dielectric constant (including air gaps with $\varepsilon_r=1$), or various concentrations of absorber. Air spaces can also be designed in to 3D printed structures. Thus, every layer has a custom profile of dielectric constant and absorption. Building these layers in to a 3D object creates a customizable profile of dielectric constant and absorption as a function of spatial coordinates x, y, and z.

Application of three-dimensional (3D) printing to RF absorber material has several favorable properties including the ability to design an arbitrary shape in a computer model and then directly manufacture the part through a variety of 3D printing processes. The 3D printing process described herein also enables arbitrary design of an interior structure for a solid part. Since 3D printed parts are built layer by layer, very complex inner structures, including matrices of hollow spaces, are possible. Such spaces could be changed arbitrarily as a function of location in 3D space, enabling tapering of material properties in multiple directions. Such designs would be difficult, or impossible, to achieve with conventional manufacturing techniques.

Additionally, multiple layers of plastics with varied dielectric constant and absorber concentration could be built directly through 3D printing. Such structures could be designed and directly printed in 3D form. Duplicating such construction with conventional techniques (e.g., cutting and joining small pieces, casting multiple parts) would be very difficult in comparison.

A 3D printer is formed with at least one extruder, or print head, formed to receive a printer filament. Typically, a one head printer is limited to 3D printing a single type of material, so if this material is an absorber loaded plastic, the printed 3D structures will be made with one type of plastic only. Thus, everywhere the plastic is printed, it will have the same concentration of absorber. It is possible to 3D print air gaps anywhere in the printed structure, so the absorption and dielectric properties can be customized with as few as one extruder, and thus one filament type. If a solid volume is half filled with air holes, it will absorb much less than a solid piece. If the air holes are reduced from one end to the other, a gradual increase in absorption and dielectric constant can be created, even with a single material.

Multiple extruders with multiple filaments can allow regions of plastic only with no absorber, multiple types of plastic, air gaps, and multiple concentrations of absorbing material. A three head printer, for example, could have one acrylonitrile butadiene styrene (ABS) filament with dielectric constant 2.5, one polyactic acid (PLA) filament with dielectric constant 3.1, and one loaded PLA filament with carbon absorber. It could also have one filament of plastic only, one lightly absorber loaded filament, and one heavily absorber loaded filament. The possibilities for creating solid objects with minimal RF reflection are enhanced with multiple extruders or print heads and, thus, multiple materials.

Non-limiting examples of materials used for 3D printing include plastic filaments designed for 3D printing by Fused Deposition Modeling (FDM) is commercially offered with added carbon fiber (e.g., ColorFabb XT-CF2-0, proto-pasta carbon fiber PLA, ProtoPlant Carbon Fiber PI-A), carbon nanotubes (e.g., Carbon Nanotube 3D Printer Filament), and continuous carbon fiber (e.g., MarkFor3D Mark One Composite 3D Printer). These filaments can be loaded into a variety of inexpensive FDM 3D printers, enabling direct printing of carbon-loaded 3D objects with variable density.

Carbon and other conductor loaded filaments are commercially available, but no advertisement exists for use of these filaments as microwave absorbers. ProtoPlant, located at 5601 East 18$^{th}$ Street #102, Vancouver, Wash., 98661, produces carbon fiber, stainless steel, magnetic iron, and another forms of conductive PLA filament. Many types of plastics and many types of loaded commercial filaments are available and can be used with the invention described herein. Further, if desired, custom filaments can be made to achieve desired RF absorption properties. Custom filaments created with both carbon in various forms and density reducing material, such as glass beads, further expands the range of material properties (e.g., density and absorption per unit length) available for the design of custom 3D printed RF absorbers.

Black Magic 3D, located at Suite 111, 4603 Middle Country Road, Calverton, N.Y. 11933, produces a high conductivity filament referred to as a conductive graphene filament. The conductive graphene filament has one of the highest RF absorption properties of the commercially available loaded filaments for FDM printing. Significantly, these commercial filaments can play a role in the invention described herein, but they were created to allow 3D printing of conductors, not absorbers.

Common plastics used for FDM style 3D printing include acrylonitrile butadiene styrene (ABS), polylactic acid (PLA), high impact polystyrene (HIPS), polyvinyl alcohol (PVA), polycarbonate, and nylon. Each of these plastics has characteristics relevant to the design of RF absorbers, phase sifters, and any RF application depending on bulk characteristics. The material PLA in particular has a density of 1.3 grams per cm$^3$, a dielectric constant (epsilon) of 3.1, and electrical resistivity of $4.3 \times 10^{17}$ Ohm-centimeters. These characteristics must be taken in to account if this were the material to which carbon was added to form a radio frequency absorber. In addition to FDM, the Selective Laser Sintering (SLS) process, typically utilizing nylon powder, could also be adapted to include carbon loading. A SLS process is described at http://www.paramountind.com/selective-laser-sintering-material.html, taken on Feb. 3, 2016.

A multi-extruder 3D FDM printer would allow simultaneous use of unloaded plastic, allowing manufacturing of dielectric regions with adjustable characteristics, density and bulk dielectric constant, combined with regions loaded with absorbing material (e.g., carbon in various forms) as well as empty spaces within a 3D printed structure. Air gaps with $\varepsilon_r=1.0$ can also be 3D printed. Impedance matching can be enhanced through the ability to arbitrarily design 3D structures based on both dielectrics and absorbers with direct conversion from a computer model to a solid object. The system described herein can utilize a variety of printer filaments including, but not limited to, some plastic filaments that are unloaded, various forms of plastic filaments with different dielectric constants, and some plastic filaments that can have different concentrations of RF absorbing material.

The various methods of 3D printing, or additive manufacturing, including Fused Deposition Modeling (FDM), Selective Laser Sintering (SLS), and Stereolithography (STL) are all possible for manufacturing of 3D printed absorbers. The embodiments described herein focus on application of FDM; however, it can be appreciated by one skilled in the art that other methods are possible. Applying FDM to 3D printing of absorbers includes use of plastic filament loaded with absorber material (e.g., carbon). The filament is melted by extruders and deposited in computer controlled patterns in multiple layers, building up the desired 3D structure. A multi-extruder 3D printer allows filaments with various concentrations of absorber material, or no absorber material, to be applied so that both absorption and dielectric constant can be selected as a function of location in three-dimensional space. A non-limiting example of a commercially available 5-head FDM printer is produced by ORD Solutions located at 6-250 Dundas Street South, Suite 114, Cambridge, Ontario, Canada. Five different plastics, different absorber loading concentrations, and support material could all be applied using the printer. In other words, five or more different materials could be applied to a single 3D print.

Application of SLS or SLA (stereolithography) to printing absorbers would be limited to uniform concentration of absorber, since powder or liquid resin is used to make 3D prints, and different mixtures cannot be applied to different layers or different regions. The processes still enable custom shapes to be 3D printed, but it might be difficult to vary concentration of absorber as a function of location inside of the 3D printed object. PolyJet and Objet technologies, on the other hand, function similar to ink jet printing. These technologies eject ultraviolet (UV) curable material that is directly cured as it prints. It is possible to have multiple jets, so if one or more jets had absorber loading, a similar gradient of properties could be achieved.

Empty spaces may also be incorporated within a 3D printed structure to eliminate loss and reduce dielectric constant in selected regions. Multiple extruders also provide a means of applying support material that may be necessary to 3D print complex three-dimensional shapes. Such support material may be later removed mechanically (i.e., broken off) or dissolved chemically without affecting the 3D printed model. Each printer filament comprises a predetermined proportion of an RF absorber material and a base material, such as plastic. RF absorption at different regions of the 3D structure is varied by depositing greater and lesser amounts of plastic loaded with absorber, unloaded plastic, and empty space. Dielectric constant can also be varied by applying different plastics and by creating empty spaces within a 3D printed structure. Furthermore, correct selection of dielectric constant and thickness of one quarter wavelength can cause destructive interference of reflected waves, reducing reflection. Multiple antireflection (AR) coatings can increase the bandwidth of this effect. The exact required dielectric constant for an antireflection coating can be achieved by mixing two or more plastics with different dielectric constants using multiple extruders, or by incorporating air gaps in the material.

Using 3D printing according to embodiments of the present disclosure will allow RF absorbers to have custom shapes, but more importantly, custom internal structures. RF absorbers shaped to fit inside of waveguides, especially in complex geometries, can be best made using 3D printing. Current techniques include casting and manual shaping (e.g., cutting and gluing together small pieces). These current techniques are incapable of producing custom internal profiles of dielectric constant and absorption. In one embodiment of the present disclosure, the 3D structure includes a custom profile of internal RF absorber materials and a custom shape. Additionally, parts (e.g., cast microwave absorbers) that are currently produced using casting will be more quickly and easily produced using 3D printing even if the profile is uniform. These can be 3D printed with a single extruder and a single filament. Moreover, 3D printed absorbers could also be produced in a flexible form that might be conformable. For instance, NinjaFlex is a line flexible filaments for use in 3D printers produced by Fenner Drives, Inc. located at 311 W. Stiegel Street, Manheim, Pa. 17545.

RF absorption and dielectric constant can also be varied by including void spaces (gaps or apertures) with 3D shapes inside of the material. For instance, if a 3D printed solid is half empty, the absorption and dielectric constant of the material are changed. Embodiments of the present disclosure describe 3D printing of apertures inside of 3D printed structures, where the sizes and shapes of the apertures can be customized according to the requirements desired. For example, transitioning from free space to heavily loaded absorber is best accomplished by varying properties from air to absorber in a gradual sense. Dielectric material with air gaps can have a low effective dielectric constant, enabling a steady transition from free space properties. The air spaces can be reduced until solid dielectric is used, and increasing concentration of absorber can be 3D printed as a function of depth in a material.

Currently, RF absorber and carrier/base material (e.g., foam, plastic, epoxy) are mixed in a specific proportion to determine absorption. In an embodiment of the present disclosure, one can use a plastic filament with some proportion of absorber (e.g., carbon), but there will also be a second print head that is plastic only. By building a 3D structure with some regions of RF absorber and some of only plastic (i.e., base material), the bulk RF absorption can be adjusted in a continuous fashion. Using conventional techniques, batches of absorber mixed with base material can be made, but the bulk properties are uniform (i.e., all the same throughout the structure). On the other hand, 3D printed absorbers can have this ratio change as a function of 3D location: x, y, z.

The simplest form of an FDM 3D printer consists of an extruder that melts plastic filament. The position of the extruder is controlled by a computer directing motors to mechanically move the extruder to a desired location. A computer also controls the feed speed of plastic filament entering the extruder where it is melted and ejected. Taken together, this system ejects melted plastic on to controlled locations on a surface. A 2D layer is built by depositing melted plastic over an x, y space. Ejecting plastic on to a curved surface is possible, but flat surfaces are typical. The extruder then takes a step in z space, and the process repeats. Filament pre-loaded with absorbing material (e.g., carbon) is possible, and such loaded filaments are commercially available. An FDM 3D printer that uses multiple print heads can extrude melted plastic with various levels of absorber loading. Printing these separate materials in close proximity, printing plastic that is not loaded with absorber, and printing open spaces allows continuous variation of both absorption and dielectric properties.

Gradual variation of absorption properties and dielectric constant improves RF matching from free space into a region of dielectric and/or absorbing material. Such variation has traditionally been difficult to manufacture using discrete pieces of dielectric and absorbing material cut and shaped, then bonded together. Applying 3D printing allows continuous, customizable profiles of absorption and dielectric constant.

Figure 1:
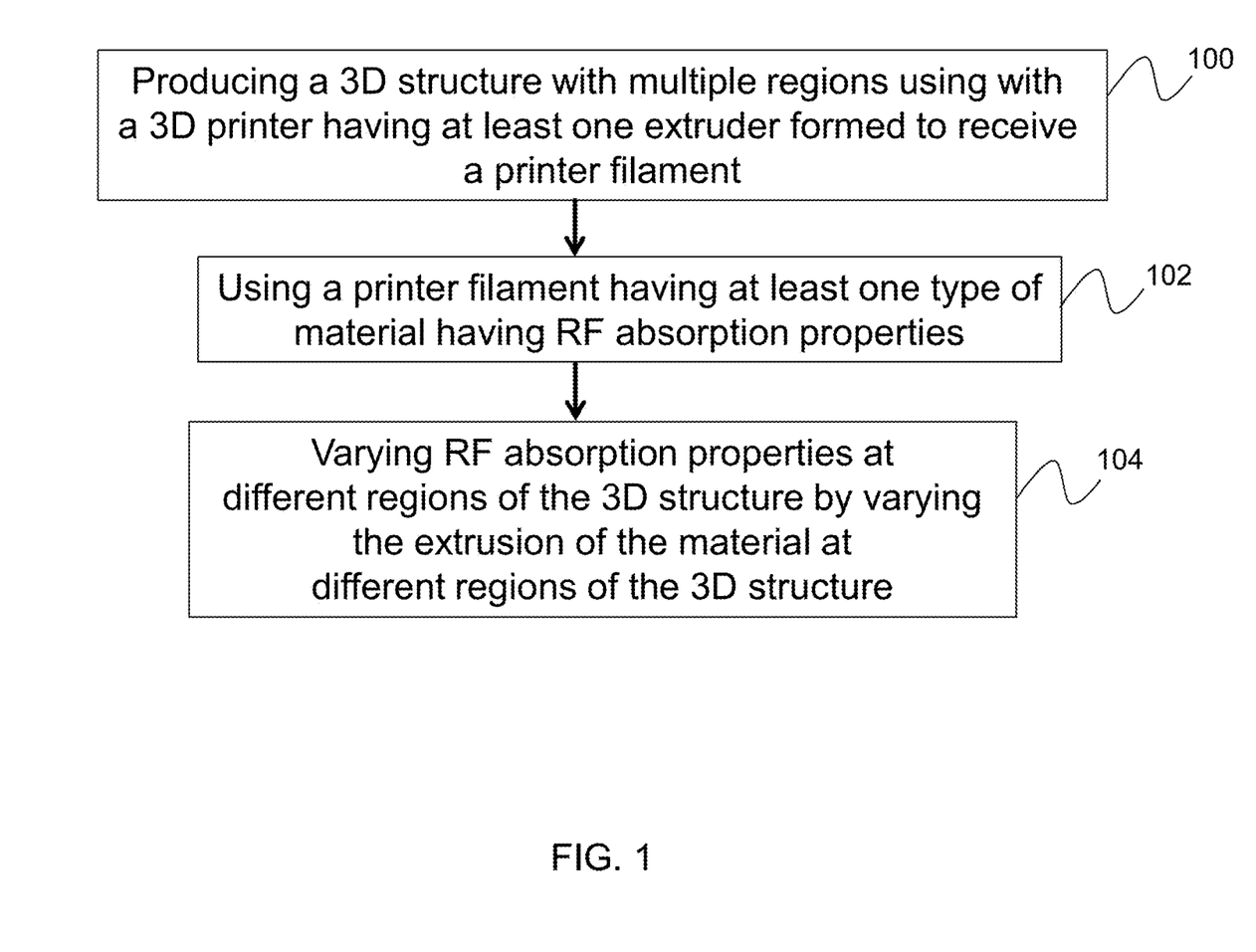
FIG. 1 is a flow diagram illustrating a method for producing a three-dimensional (3D) structure using 3D printing according to embodiments of the present disclosure.

FIG. 1 depicts a flow diagram of producing a 3D RF absorber according to embodiments of the present disclosure. As described above, the method comprises producing a 3D structure, having multiple regions, with a 3D printer having at least one extruder formed to receive a printer filament (element 100). The 3D printer uses a printer filament having at least one type of material having RF absorption properties (element 102). RF absorption properties at different regions of the 3D structure are varied by varying the extrusion of the at least one type of material at different regions of the 3D structure (element 104).

Figure 2A:
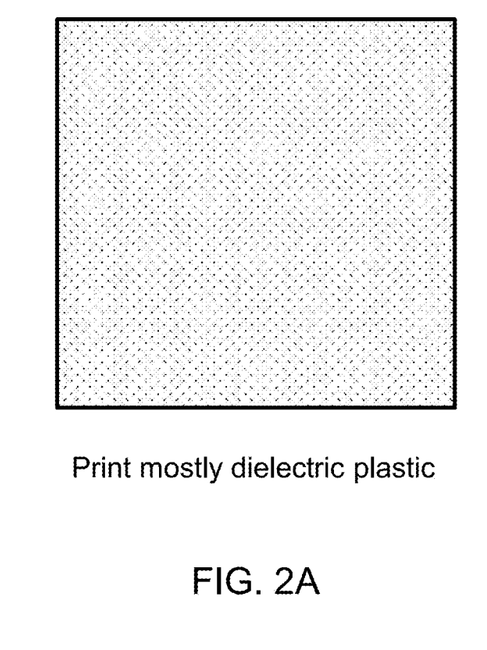
FIG. 2A illustrates a region of a structure printed of mostly dielectric plastic according to embodiments of the present disclosure.
Figure 2B:
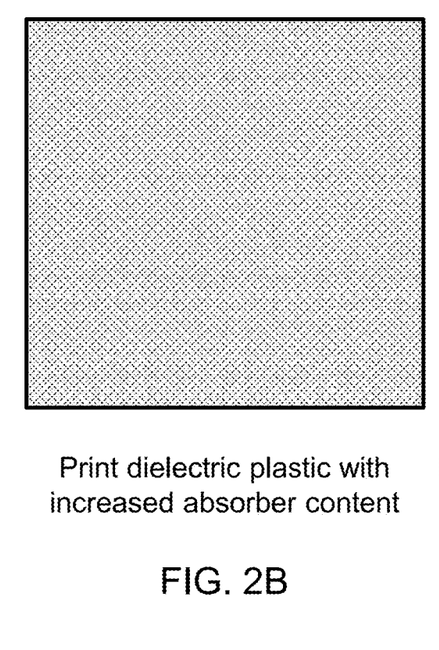
FIG. 2B illustrates a region of a structure printed of dielectric plastic with increased concentration of absorber material compared to FIG. 2A according to embodiments of the present disclosure.
Figure 2C:
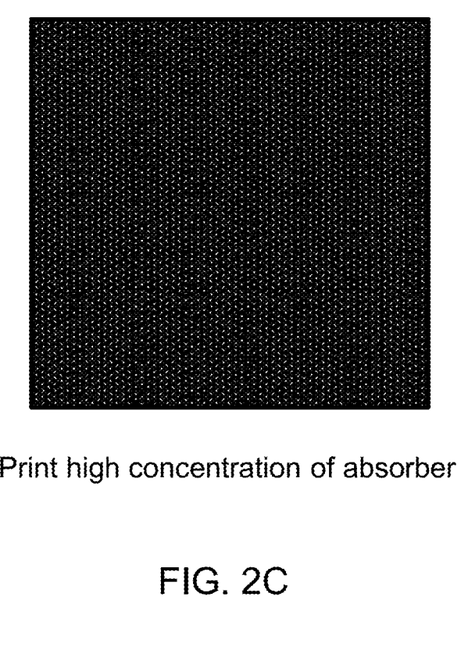
FIG. 2C illustrates a region of a structure printed with a high concentration of absorber material compared to FIG. 2B according to embodiments of the present disclosure.

FIGS. 2A-2C illustrate that multiple printer filaments (or print heads) enable selectable mixtures of dielectric and absorber according to embodiments of the present invention. FIG. 2A depicts a region of a structure printed of mostly dielectric plastic (i.e., base material). FIG. 2B depicts a region of a structure printed of dielectric plastic with increased concentration of absorber material compared to FIG. 2A. FIG. 2C depicts a region of a structure printed with a high concentration of absorber material compared to FIG. 2B.

Figure 3A:
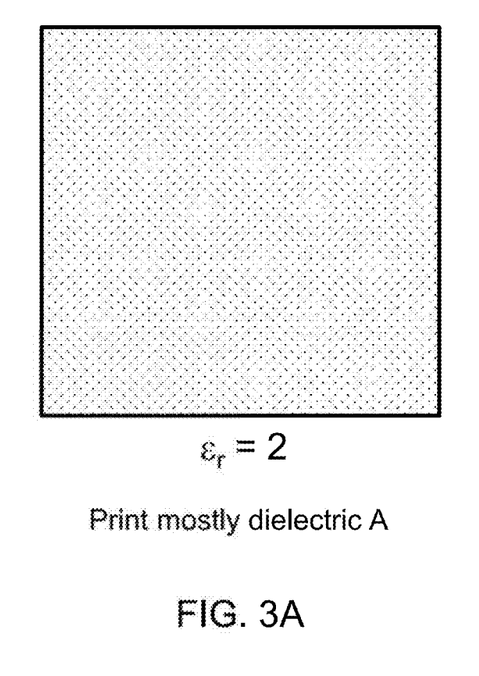
FIG. 3A illustrates a region of a structure printed of mostly dielectric constant A, resulting in a solid object with dielectric constant slightly higher than that of material A according to embodiments of the present disclosure.
Figure 3B:
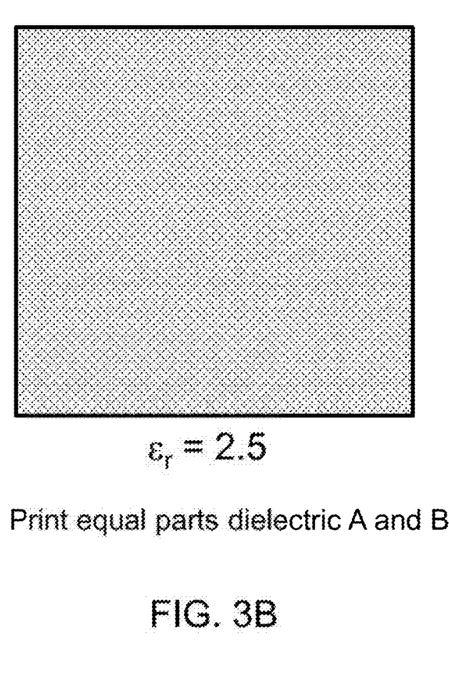
FIG. 3B illustrates a region of a structure printed with equal parts of dielectric constants A and B, resulting in a solid object with dielectric constant between those of material A and material B according to embodiments of the present disclosure.
Figure 3C:
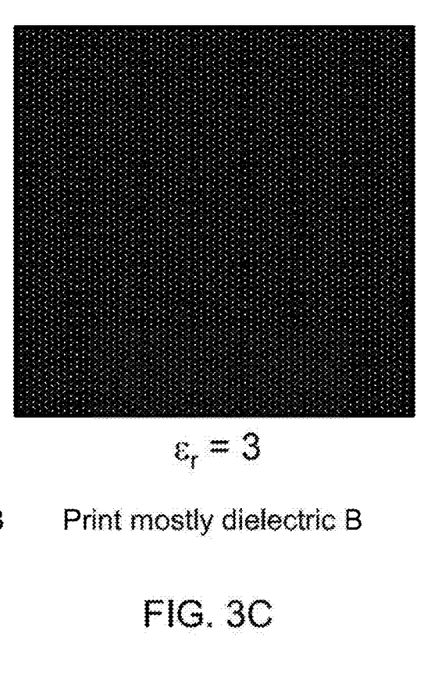
FIG. 3C illustrates a region of a structure printed mostly of dielectric constant B, resulting in a solid object with dielectric constant slightly lower than that of material B according to embodiments of the present disclosure.

FIGS. 3A-3C illustrate that multiple printer filaments enable selectable mixtures of dielectrics according to embodiments of the present invention. In this non-limiting example $\varepsilon_{rA}=1.9$ and $\varepsilon_{rB}=4$, where $\varepsilon$ represents dielectric permittivity, and r denotes relative. Vacuum has permittivity of a constant value and relative dielectric constant $\varepsilon_r$ equal to exactly 1.0. Air has relative dielectric constant close to 1.0. Any other material will have permittivity of this value multiplied by some number, which is the relative permittivity. FIG. 3A depicts a region of a structure printed of mostly dielectric constant A ($\varepsilon_r=2$). FIG. 3B depicts a region of a structure printed with equal parts of dielectric constants A and B ($\varepsilon_r=2.5$). FIG. 3C depicts a region of a structure printed mostly of dielectric constant B ($\varepsilon_r=3$).

Figure 4:
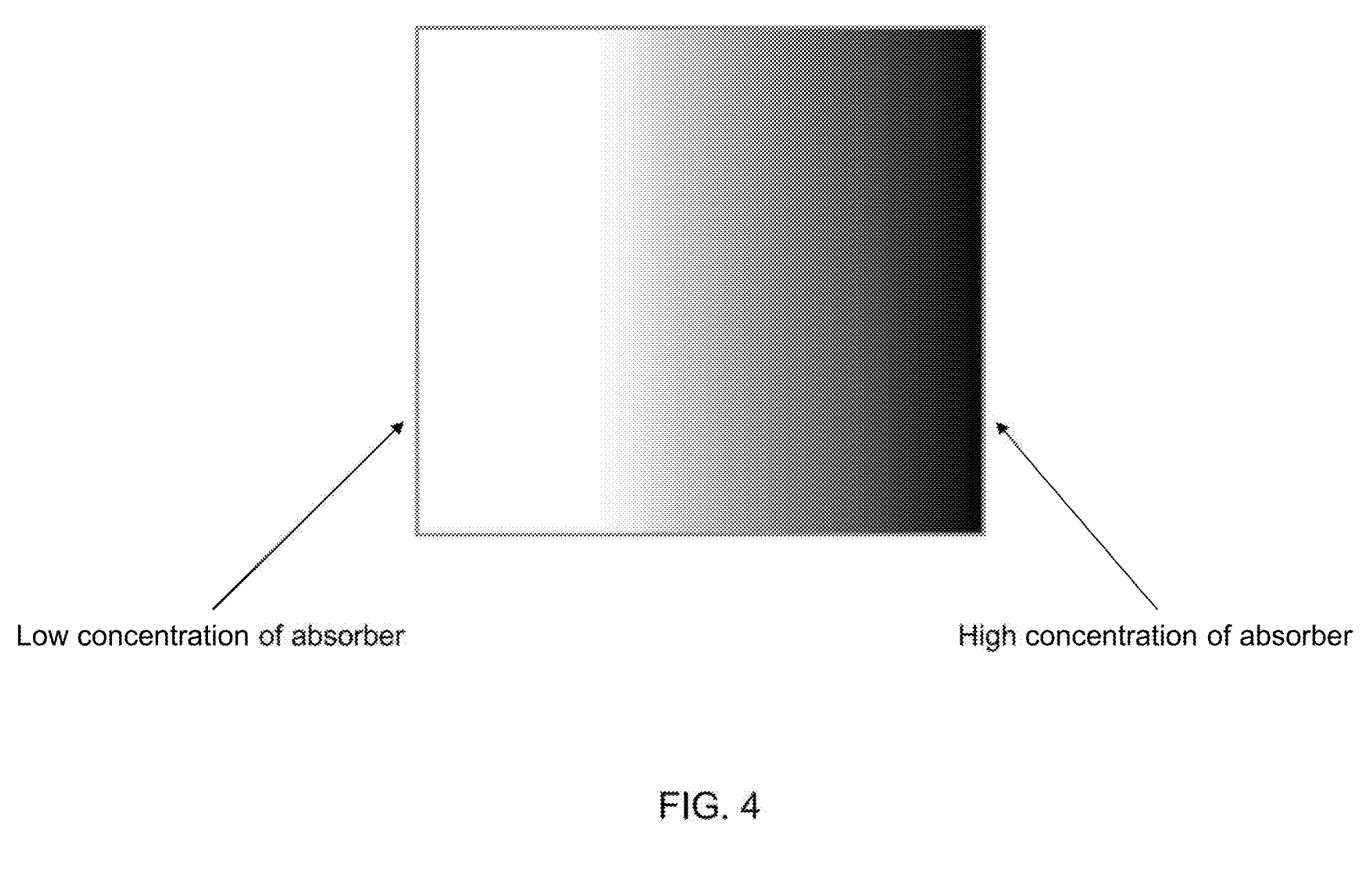
FIG. 4 illustrates continuous variation of multiple materials in 3D printing allowing creation of gradients of dielectric constant and absorption according to embodiments of the present disclosure.

FIG. 4 illustrates that continuous variation of multiple materials in 3D printing allows creation of gradients of dielectric constant and absorption according to embodiments of the present invention. On the left side of the gradient of the structure depicted is a low concentration of absorber. On the right side of the gradient is a high concentration of absorber. A two-dimensional (2D) representation is shown, but gradients are possible in all directions using 3D printing. Gradients decrease reflection.

Figure 5:
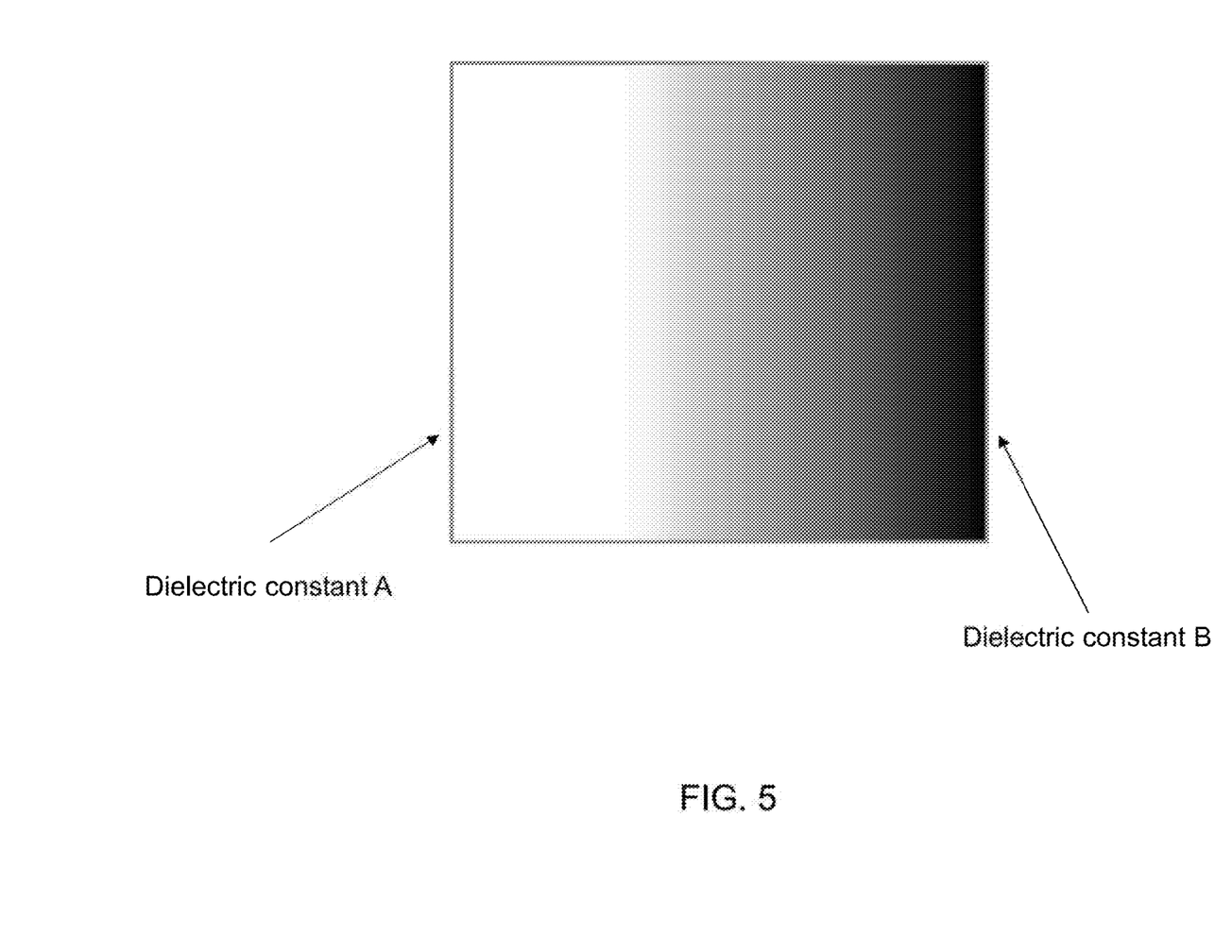
FIG. 5 illustration continuous variation of dielectric constant by variation of concentration of materials A and B with two separate dielectric constants according to embodiments of the present disclosure.

FIG. 5 illustrates a continuous variation of dielectric constant by variation of concentration of elements A and B with two separate dielectric constants. Similar to varying absorber concentration, dielectric constant can be varied continuously by mixing varying proportions of multiple elements, accomplished with two or more extruders. Component A or B may also be air gaps with $\varepsilon_r=1.0$.

Figure 6:
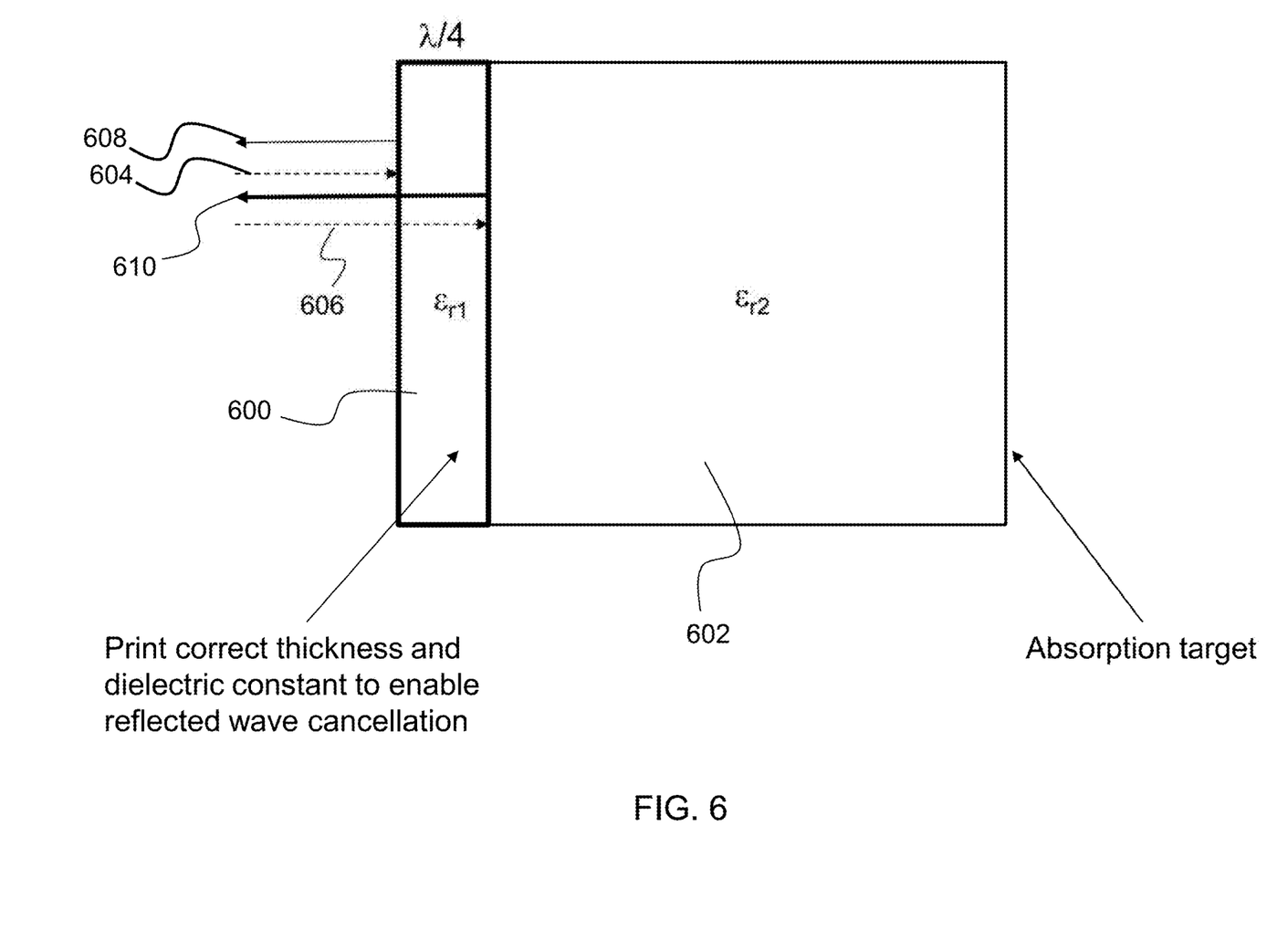
FIG. 6 illustrates printing of anti-reflection layers according to embodiments of the present disclosure.

As described above, correct selection of dielectric constant and thickness of one quarter wavelength can cause destructive interference of reflected waves, reducing reflection. Multiple antireflection (AR) coatings can increase the bandwidth of this effect. FIG. 6 illustrates that multiple printer filaments enable printing of anti-reflection layers. First 600 and second 602 regions of the structure. In the first region 600 (i.e., the AR layer), the 3D printer prints the correct thickness and dielectric constant to enable reflected wave cancellation. In this example, the second region 602 is the absorption target. $\lambda/4$ represents one quarter wavelength. The dashed arrows 604 and 606 represent incoming waves, and the solid arrows 608 and 610 represent reflected waves. Every time a wave hits a surface where $\varepsilon_r$ changes, there is reflection. If a layer is $\lambda/4$ is thick, the wave that comes in and bounces back travels a total distance of $\lambda/2$, so it will be the opposite of what came in.

By selecting the dielectric constant of the AR layer (first region 600) correctly, the wave reflected by the first layer (top solid arrow 608) and the second layer (bottom solid arrow 610) will have the same amplitude, but one is exactly the negative of the other. When that happens, they cancel each other out, meaning no reflected wave. Significantly, if $\varepsilon_{r1}$ is selected correctly, there will be little or no reflection of an incoming wave.

Figure 7:
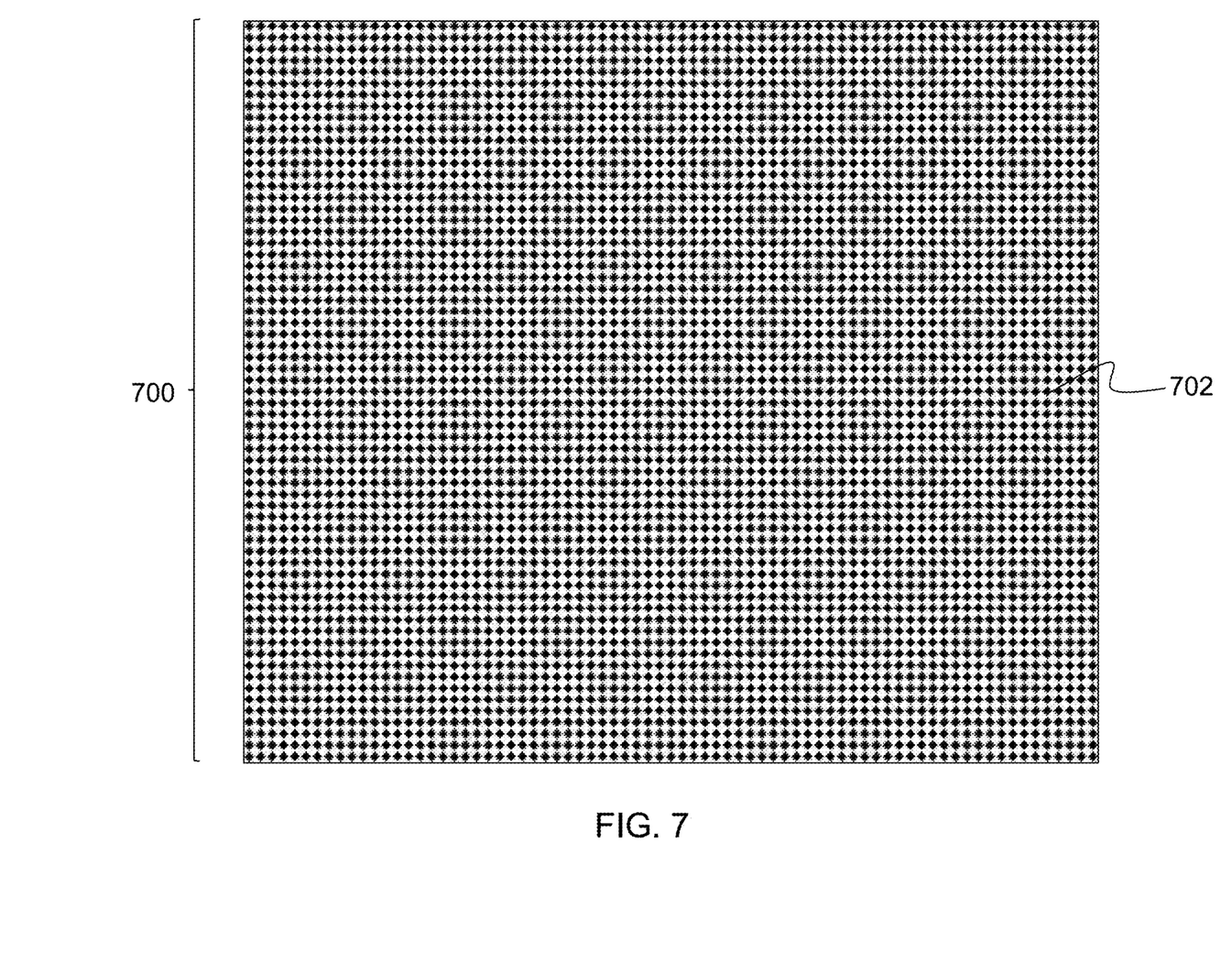
FIG. 7 illustrates a 3D printed region filled with a uniform mixture of one or more dielectrics and one or more absorber materials as well as possible air gaps printed by one or more extruders in a 3D printer according to embodiments of the present disclosure.

FIG. 7 is an illustration of a 3D structure 700 printed with a customizable internal structure. The internal structure 702 can be void (i.e., air) spaces or alternating materials.

Figure 8:
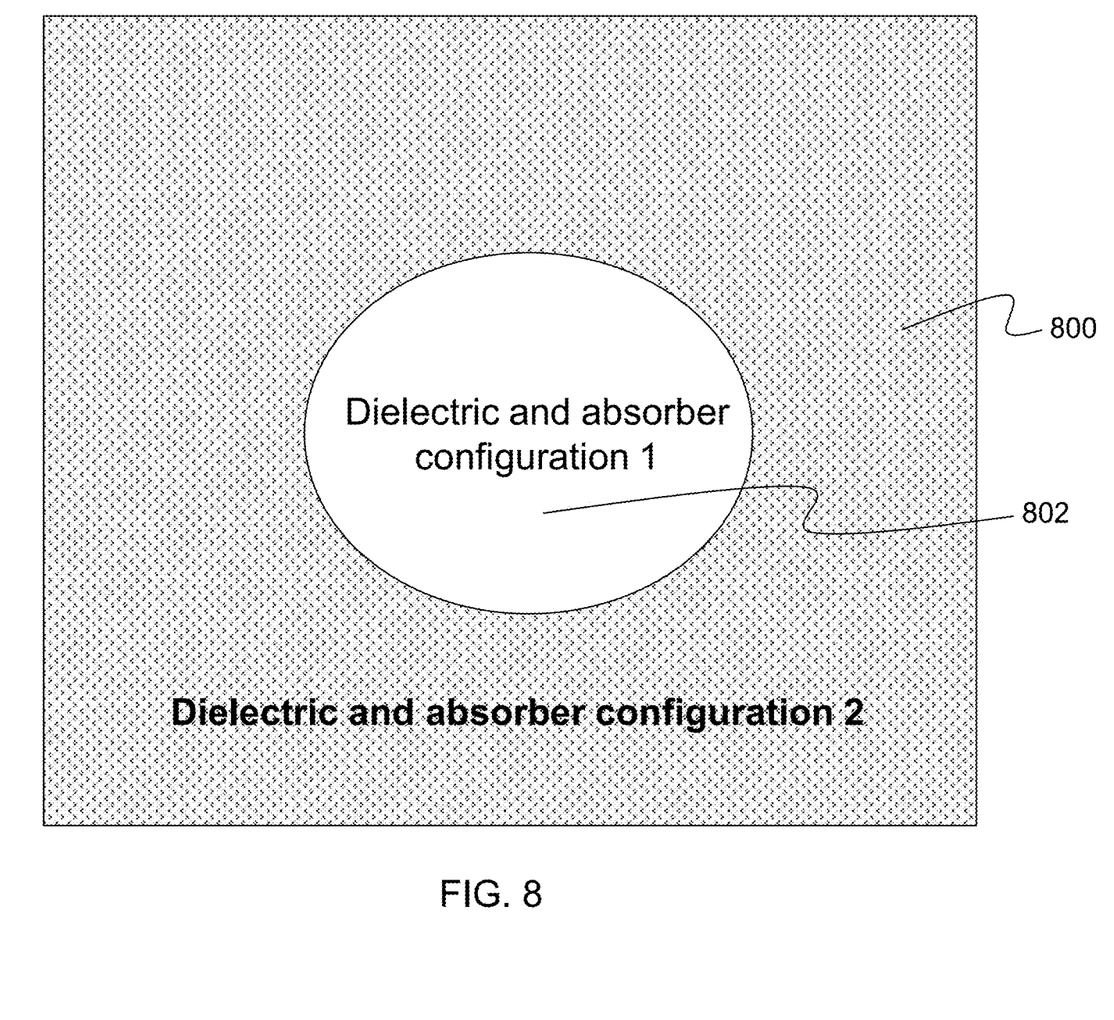
FIG. 8 illustrates an aperture printed within a 3D structure according to embodiments of the present disclosure.

FIG. 8 depicts a 3D structure 800 having an aperture 802 therein printed according to embodiments of the present disclosure. The aperture can be two-dimensional (e.g., a hollow cylinder inside) or three-dimensional (e.g., a spherical void inside).

Figure 9:
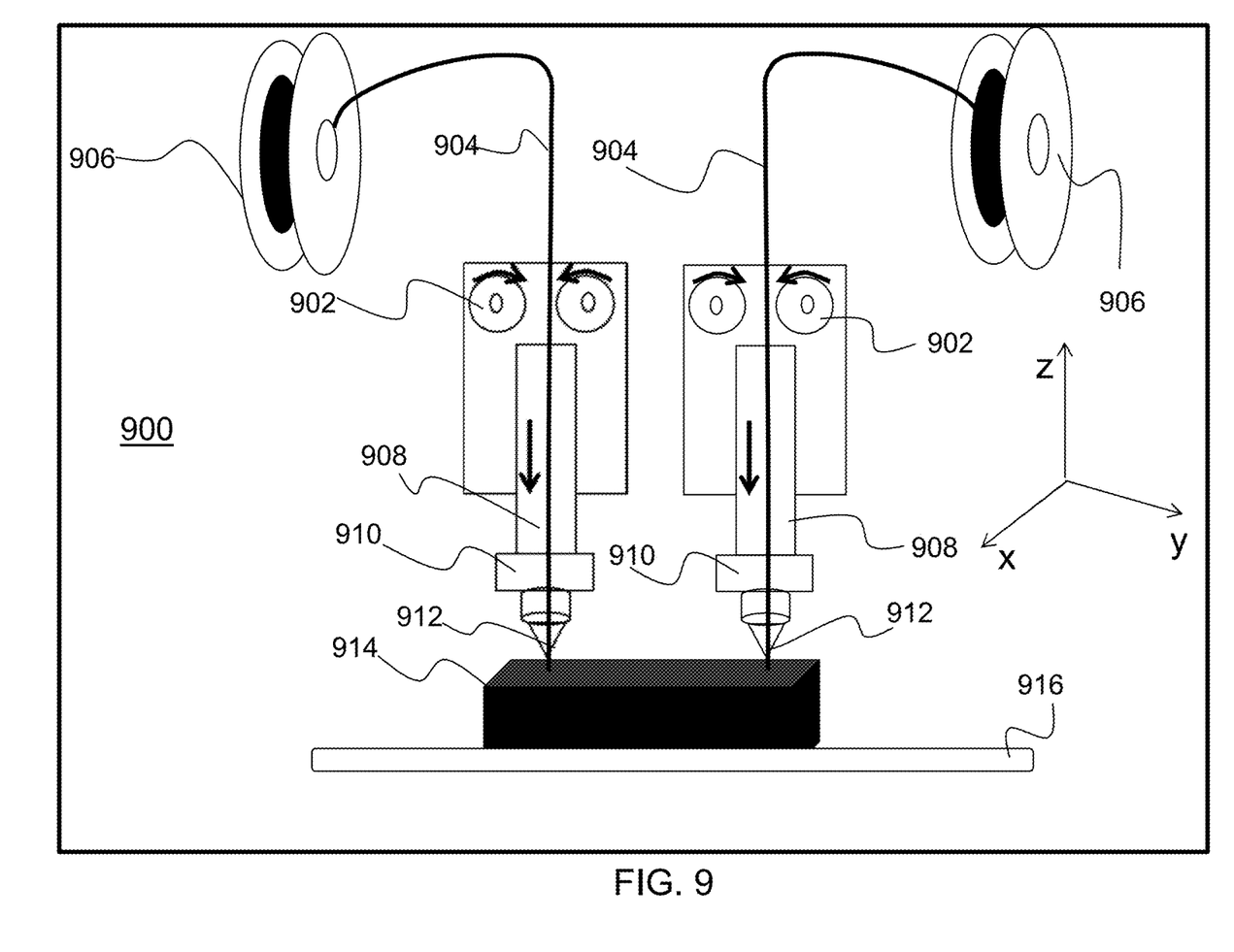
FIG. 9 illustrates components of a 3D printer according to embodiments of the present disclosure.

FIG. 9 illustrates components of a 3D printer 900. Rotating cylinders 902 act to pull the filament 904 from a spool 906 of filament 904 through the extruder 908. The filament 904 is heated up in the printer head 910. Hot filament 904 material (e.g., plastic) is pushed through a small opening 912 in the extruder 908. The filament 904 cools, giving the part 914 structure. The print bed 916 is kept warm to prevent the filament 904 from cooling too fast. The extruder 908 is moved in x, y, and z dimensions in space with respect to the print bed 916. This can be accomplished by moving the extruder 908 with a fixed print bed 916, moving the print bed 916 with a fixed extruder 908, or moving both. As a non-limiting example, a 3D printer 900 moves the print bed 916 in z and y dimensions, and the extruder 908 moves in x dimension. Alternatively, the extruder 908 in x and y dimensions, and the print bed 916 moves in z dimension. FIG. 9 depicts a 3D printer 900 having two extruders 908; however, as can be appreciated by one skilled in the art, the 3D printer 900 of the invention described herein can have one or more extruders 908 to achieve the functions described.

What is claimed is:

1. A method of designing and manufacturing a radio frequency (RF) absorber for a structure intended to guide radio frequencies, the method comprising acts of:
    designing a custom profile of a set of desired RF absorption properties and desired dielectric properties for a RF absorber;
    producing a computer model for the RF absorber based on the custom profile of desired RF absorption properties and desired dielectric properties;
    using a three-dimensional (3D) printing process, depositing melted plastic filament loaded with a RF absorber material in computer controlled patterns according to the computer model;
    producing the RF absorber having the custom profile of desired RF absorption properties and desired dielectric properties; and
    using the RF absorber internally in a structure intended to guide radio frequencies.

2. The method as set forth in claim 1, further comprising an act of depositing melted unloaded plastic filament in computer controlled patterns, such that the RF absorber comprises at least one region of RF absorber material and at least one region of plastic.

3. The method as set forth in claim 2, further comprising an act of printing, using the 3D printing process, the RF absorber to have more regions of plastic than RF absorber material.

4. The method as set forth in claim 2, further comprising an act of printing, using the 3D printing process, the RF absorber to have more regions of RF absorber material than plastic.

5. The method as set forth in claim 2, further comprising acts of:
    determining a desired thickness and dielectric constant for an anti-reflection coating for the RF absorber; and
    printing, using the 3D printing process, the anti-reflection coating onto the RF absorber having the custom profile of desired RF absorption properties and desired dielectric properties, wherein the anti-reflection coating comprises the desired thickness and dielectric constant for reflected wave cancellation.

6. The method as set forth in claim 5, wherein the 3D printing process comprises depositing and mixing melted unloaded plastic filaments having different dielectric constants using a plurality of 3D printing extruders to produce the RF absorber having the custom profile of desired RF absorption properties and desired dielectric properties.

7. The method as set forth in claim 1, further comprising an act of printing, using the 3D printing process, air gaps in the RF absorber with a relative permittivity of $E_r=1.0$.

8. The method as set forth in claim 1, comprising designing the RF absorber to fit inside of a waveguide.

* * * * *